(12) United States Patent
Bannayan et al.

(10) Patent No.: US 11,022,956 B2
(45) Date of Patent: Jun. 1, 2021

(54) SYSTEM AND METHOD FOR FEEDBACK-BASED DRESSING OF A GRINDING WHEEL

(71) Applicant: GLEBAR ACQUISITION, LLC, Ramsey, NJ (US)

(72) Inventors: John Bannayan, New York, NY (US); Robert C. Gleason, Butler, NJ (US)

(73) Assignee: Glebar Acquisition, LLC, Ramsey, NJ (US)

( * ) Notice: Subject to any disclaimer, the term of this patent is extended or adjusted under 35 U.S.C. 154(b) by 47 days.

(21) Appl. No.: 15/427,316

(22) Filed: Feb. 8, 2017

(65) Prior Publication Data

US 2017/0227949 A1   Aug. 10, 2017

Related U.S. Application Data

(60) Provisional application No. 62/293,065, filed on Feb. 9, 2016.

(51) Int. Cl.
  *G05B 19/4065* (2006.01)
  *B24B 49/12* (2006.01)
  *B24B 53/08* (2006.01)

(52) U.S. Cl.
  CPC .......... *G05B 19/4065* (2013.01); *B24B 49/12* (2013.01); *B24B 53/08* (2013.01);
  (Continued)

(58) Field of Classification Search
  None
  See application file for complete search history.

(56) References Cited

U.S. PATENT DOCUMENTS

| | | | | |
|---|---|---|---|---|
| 3,683,885 A | * | 8/1972 | Kikuchi | B24B 53/07 125/11.03 |
| 4,136,390 A | * | 1/1979 | Farrell | B24B 17/10 451/228 |

(Continued)

FOREIGN PATENT DOCUMENTS

| | | |
|---|---|---|
| DE | 199 40 686 A1 | 3/1999 |
| EP | 2 624 068 A1 | 8/2013 |

(Continued)

OTHER PUBLICATIONS

International Search Report issued by WIPO dated Jun. 6, 2017, in connection with International Application No. PCT/US17/16913 (in English).

(Continued)

*Primary Examiner* — Jason Lin
(74) *Attorney, Agent, or Firm* — Benesch, Friedlander, Coplan & Aronoff LLP

(57) ABSTRACT

A method and a system are provided for automatically dressing a grinding wheel used to grind workpieces. A workpiece is scanned to determine dimensions of the workpiece. A computer-readable dimensions datafile is generated containing the dimensions of the workpiece. A processor electronically compares the dimensions of the workpiece with reference or desired dimensions to obtain comparison results, and generates a computer-readable comparison datafile containing the comparison results. The processor transmits the comparison datafile containing the comparison results to a CNC controller, which utilizes the comparison results to control a shaping tool used to shape or dress the grinding wheel so that the grinding wheel produces workpieces having the reference or desired dimensions.

17 Claims, 7 Drawing Sheets

(52) U.S. Cl.
CPC .............. *G05B 2219/45159* (2013.01); *G05B 2219/50309* (2013.01)

(56) References Cited

U.S. PATENT DOCUMENTS

| | | | | |
|---|---|---|---|---|
| 4,192,102 | A * | 3/1980 | Jessup | B24B 5/22 451/242 |
| 4,471,580 | A * | 9/1984 | Robillard | B24B 49/183 451/21 |
| 4,507,896 | A * | 4/1985 | Smith | B24B 5/22 451/242 |
| 4,562,669 | A * | 1/1986 | Baltzer | B24B 5/355 451/24 |
| 4,599,786 | A * | 7/1986 | Uhtenwoldt | B23Q 7/046 483/14 |
| 4,631,870 | A | 12/1986 | Sun | 51/165.71 |
| 4,635,401 | A | 1/1987 | Nakaji | 51/5 D |
| 4,651,472 | A * | 3/1987 | Scheder | B24B 49/04 451/22 |
| 4,712,332 | A * | 12/1987 | Smith | B24B 5/22 451/244 |
| 4,805,585 | A * | 2/1989 | Halvorsen | B24B 53/08 125/11.01 |
| 4,896,461 | A * | 1/1990 | Enosawa | B24B 5/355 451/244 |
| 5,042,205 | A * | 8/1991 | Girard | B24B 53/08 125/11.01 |
| 5,486,130 | A | 1/1996 | Kilmer, Sr. | |
| 5,538,460 | A * | 7/1996 | Onodera | B24B 7/228 125/11.04 |
| 5,624,301 | A | 4/1997 | Lenz et al. | 451/47 |
| 5,647,788 | A | 7/1997 | McHugh et al. | |
| 5,685,765 | A * | 11/1997 | Azpeitia De Diego | B24B 19/14 451/10 |
| 6,508,692 | B2 | 1/2003 | Gottschalk | 451/5 |
| 7,797,074 | B2 * | 9/2010 | Hyatt | B23B 3/168 700/164 |
| 2010/0035520 | A1* | 2/2010 | Tanaka | B24B 53/017 451/8 |

FOREIGN PATENT DOCUMENTS

| | | |
|---|---|---|
| JP | 3123595 B | 10/2000 |
| JP | 2013-000841 A | 1/2013 |
| JP | 2013000841 A * | 1/2013 |

OTHER PUBLICATIONS

Written Opinion published by WIPO dated Jun. 6, 2017, in connection with International Application No. PCT/US17/16913 (in English).

Dec. 17, 2019 Office Action in Indian Patent Application No. 201747006969.

Aug. 29, 2019 Extened Search Report in European Patent Application No. 17 75 0657.

English translation of May 29, 2020 Office Action in Chinese Patent Application No. 201780010688.3.

\* cited by examiner

SYSTEM AND METHOD FOR FEEDBACK-BASED DRESSING OF A GRINDING WHEEL

CROSS-REFERENCE TO RELATED APPLICATION(S)

This application claims the benefit of priority of U.S. Provisional Application No. 62/293,065 filed on Feb. 9, 2016, the entire contents of which is incorporated herein by reference.

FIELD OF THE INVENTION

The present invention relates to automated dressing of a grinding wheel. More specifically, the present invention relates to a system and a method for automated dressing of a grinding wheel using feedback from a workpiece measurement system.

RELATED ART

Grinders rely on an accurately shaped grinding wheel to produce workpieces having desired profile dimensions. Moreover, mass production of workpieces all having the same desired profile dimensions require the grinding wheel or wheels used to produce the workpieces to grind the workpieces reproducibly and predictably. Repeated use of a grinding wheel results in wear and/or deformation of its grinding surface and, in particular, the profile or shape of the grinding surface. This results in the grinding surface producing workpieces that deviate from the desired profile dimensions.

A grinding wheel can be initially shaped or dressed in a conventional manner by a CNC (computerized numerical control) dressing machine that shapes the grinding wheel according to an initial computerized dressing algorithm corresponding to a theoretical profile or shape of the grinding surface. However, a grinding wheel having the theoretical profile or shape does not necessarily produce workpieces having the desired profile dimensions. Thus, trial-and-error grinding runs are made to iteratively refine the dressing algorithm so that the grinding surface eventually is shaped to produce a workpiece having the desired profile dimensions. In each iterative run, a workpiece is ground and measured, and then the dressing algorithm is modified to come closer and closer to producing a workpiece having the desired profile dimensions.

As can be appreciated by persons skilled in the art, the initialization trial-and-error process can be time consuming, resulting in costly manufacturing inefficiencies. Further, the subsequent need to dress the grinding wheel to reshape it after wear and/or deformation from routine use compounds the manufacturing inefficiencies.

The wear and/or deformation of a grinding wheel can be especially problematic when the grinding wheel has multiple so-called "grinding stations" used to simultaneously grind multiple workpieces all to have the same desired profile dimensions. Each grinding station can grind differently from the other grinding stations due to, for example, different structural stresses encountered by different portions of the grinding wheel, and thus can wear and/or deform differently from the other grinding stations. As a consequence, the manufacturing inefficiencies are multiplied when dressing a grinding wheel with multiple grinding stations.

BRIEF DESCRIPTION OF THE INVENTION

In an aspect of the invention, a method and a system are provided for automatically dressing a grinding wheel. In this aspect, a CNC dressing apparatus receives electronic measurement data of multiple workpieces ground simultaneously by multiple grinding stations of a grinding wheel. The measurement data associates measurements of each of the workpieces to a corresponding one of the grinding stations. For each grinding station, the measurement data includes offset data, which is data relating to an offset between a desired dimension and a measured dimension of a workpiece ground by that grinding station. Optionally, the offset data may include data relating to multiple offsets corresponding to multiple measurement points along the workpiece ground by the corresponding grinding station. The measurement data is uploaded to a computer processor programmed to control a shaping tool of the dressing apparatus. For example, the measurement data is uploaded to a programmed microprocessor of the dressing apparatus, and the microprocessor automatically uses the measurement data to modify a shaping algorithm used to dress or shape each of the grinding stations individually. That is, each grinding station is custom-shaped according to the offset data for that grinding station.

In another aspect of the invention, a method and a system are provided for automatically dressing a grinding wheel. According to this aspect, a CNC dressing apparatus receives electronic measurement data of multiple workpieces ground simultaneously by multiple grinding stations of a grinding wheel. For each grinding station, the measurement data associates the grinding station to measurements of a workpiece ground by that grinding station. For each grinding station, the measurement data includes comparison data of a calculated difference between a measured dimension and a desired or target dimension of a reference workpiece. The target dimension may be a theoretical dimension for the workpiece, or a variation from the theoretical dimension appropriate for that grinding station. The measurement data is uploaded to a computer processor of the dressing apparatus. The processor is programmed to convert the measurement data into offset values, and to control a shaping tool of the dressing apparatus. Subsequently, each grinding station of the grinding wheel is shaped or dressed according to a predetermined CNC process modified with the offset values.

In yet another aspect of the invention, a method and a system are provided for automatically dressing a grinding wheel. According to this aspect, a workpiece is scanned by an optical scanner to obtain dimensions of the workpiece. A computer-readable dimensions datafile containing the dimensions of the workpiece is generated by a processor coupled to the scanner. The processor electronically compares the dimensions of the workpiece with reference dimensions to produce comparison results, and generates a computer-readable comparison datafile containing the comparison results. The processor transmits the comparison datafile containing the comparison results to a CNC controller, which utilizes the comparison results to control a dressing apparatus for dressing a grinding wheel used to produce workpieces having the reference dimensions.

In another aspect of the invention, a method and a system are provided for operating a CNC dressing apparatus to shape a grinding wheel. According to this aspect, a processor of the CNC dressing apparatus receives an electronic datafile containing measurement data of a workpiece ground by the grinding wheel. The measurement data includes comparison data corresponding to a difference between a measured dimension of the workpiece and a target dimension of a reference workpiece. The processor calculates an offset value based on the difference, and the processor modifies a CNC control program based on the offset value. The CNC dressing apparatus is then controlled to shape the grinding wheel according to the CNC control program modified with the offset value.

BRIEF DESCRIPTION OF THE DRAWINGS

Aspects and embodiments of the present invention will be more readily understood from a detailed description of the invention, provided below, considered in conjunction with the attached drawings, of which.

DETAILED DESCRIPTION OF EMBODIMENTS OF THE INVENTION

First Embodiment

Figure 1:
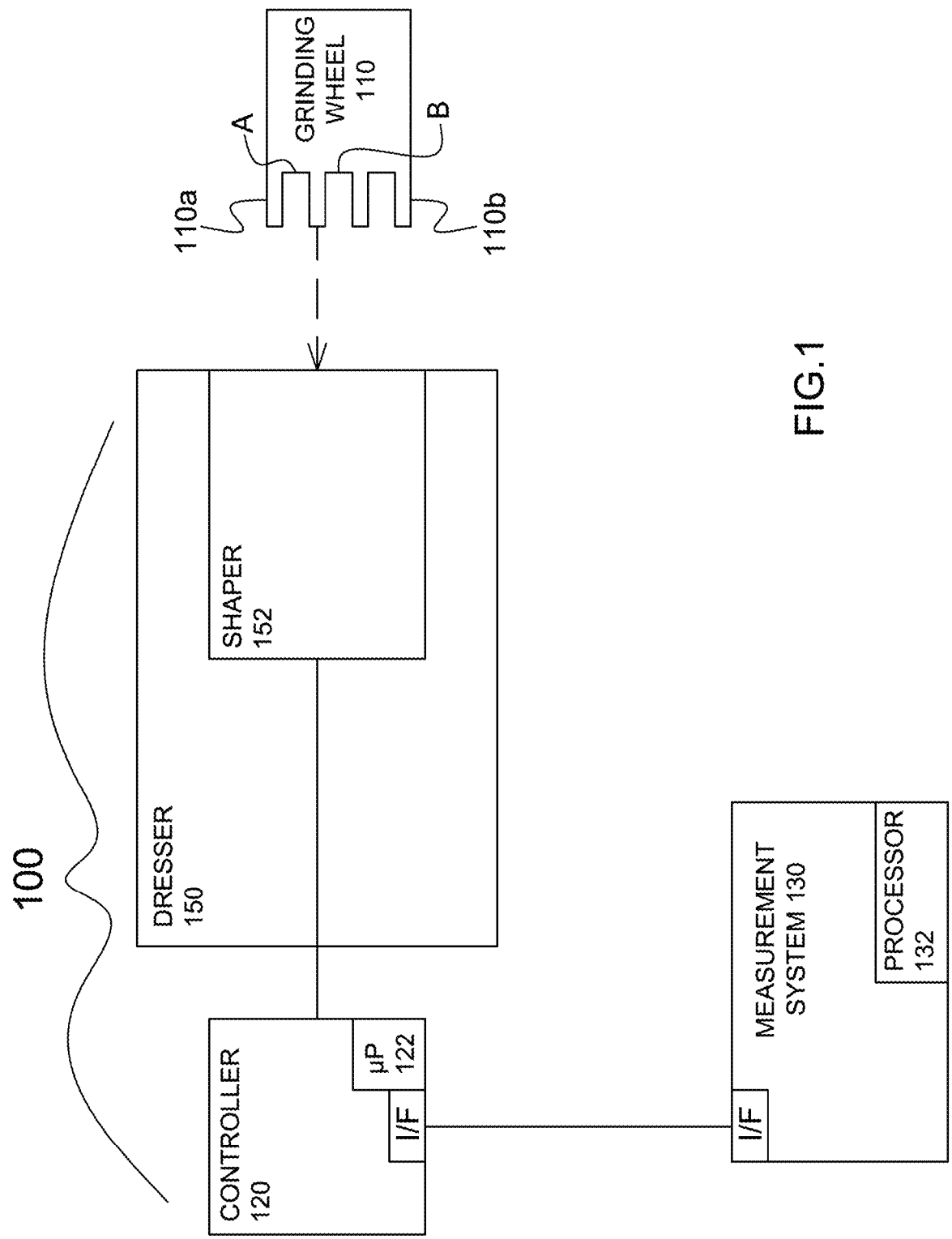
FIG. 1 schematically shows a system according to an embodiment of the invention.

FIG. 1 schematically depicts a system (100) for automatically dressing a grinding wheel (110) using a dressing apparatus (150). The system (100) includes a controller (120) programmed to control the dressing apparatus (150). The controller (120) receives, from a measurement system (130), electronic measurement data of multiple workpieces ground simultaneously by multiple grinding stations of the grinding wheel (110). An example of a grinding apparatus with a grinding wheel having multiple grinding stations is described in U.S. application Ser. No. 14/797,854, which was filed on Jul. 13, 2015, by the present Applicant, and which is incorporated by reference herein in its entirety.

The measurement data associates measurements from each of the workpieces to a corresponding one of the grinding stations. For each grinding station, the measurement data includes offset data, which is data relating to an offset between a desired dimension and a measured dimension of a workpiece ground by that grinding station. The offset data may include multiple offsets corresponding to multiple measurement points along the workpiece ground by that grinding station. The measurement data is uploaded to a computer microprocessor (122) of the controller (120), which is programmed to control a shaping tool (152) of the dressing apparatus (150). For example, the shaping tool (152) can be a diamond file or roller used to cut a desired profile or shape into each grinding station of the grinding wheel (110).

The measurement data is used by microprocessor (122) to automatically modify a shaping algorithm used to control the dressing apparatus (150) to dress or shape each of the grinding stations individually. That is, each grinding station is custom-shaped according to the offset data for that grinding station.

For example, for each grinding station, the offset data provided to the controller (120) is calculated by the measurement system (130) based on a reference profile and a measured profile of a workpiece ground by that grinding station. The reference profile may be a theoretical CNC profile provided to the measurement system (130) by the dressing apparatus (150) and used by the measurement system (130) to calculate the offset data.

For example, the dressing apparatus (150) may be the DM-9 CNC Wheel Dressing Machine (Glebar Company, Ramsey, N.J.), or the GT610CNC Centerless Thrufeed/Infeed Grinder (Glebar Company, Ramsey, N.J.), or the like.

In an aspect of this embodiment, the measurement system (130) is a computer-controlled optical scanning system, which obtains the measured profile by scanning the workpieces of the multiple workstations using light. The scanning may be performed by a controlled rastering of a light beam at a known speed, and measuring light reflection/transmission characteristics. Alternatively, the scanning may be performed by a controlled movement of the workpiece at a known speed across a light beam, and measuring light reflection/transmission characteristics. A laser beam may be used as the light beam.

The scanning of the workpiece may be performed during grinding of the workpiece by a grinding apparatus (not shown). Preferably, the scanning is performed after grinding of the workpiece has been completed.

For example, for measuring an individual workpiece corresponding to a given grinding station of the grinding wheel (110), the measurement system (130) may be the P4K Gauging System (Glebar Company, Ramsey, N.J.) used in conjunction with a grinding apparatus such as the CAM.2 Micro Grinding System (Glebar Company, Ramsey, N.J.) to scan and measure the workpiece during grinding. In another example, for multiple workpieces to be measured, such as in the case of multiple workpieces ground simultaneously by multiple grinding stations of the grinding wheel (110), the P4K Gauging System may be used to measure each workpiece after grinding has been completed. The grinding stations corresponding to the workpieces are respectively noted and correlated to the measurements. Of course, the P4K Gauging System also may be used to measure only a single workpiece after grinding.

In an aspect of this embodiment, the controller (120) controls the dressing apparatus (150) to shape or dress the grinding stations of the grinding wheel (110) individually, from a first side (110a) of the grinding wheel (110) to a second side (110b) of the grinding wheel (110) in a sequence. In another aspect of this embodiment, the controller (120) controls the dressing apparatus (150) to shape or dress the grinding stations simultaneously.

As noted above, each grinding station need not be shaped or dressed identically using the same offset data. Instead, Grinding Station A can be shaped differently from Grinding Station B based on the different measured profiles for Grinding Station A and Grinding Station B. Stated differently, each grinding station may be custom-dressed according to a measured profile of a workpiece ground by that grinding station, which may be different from the measured profile of a workpiece ground by another grinding station.

Although the first embodiment has been described for a grinding wheel having multiple grinding stations, the grinding wheel need not have more than on grinding station.

The controller (120) may be a general-purpose computer or a standard processor chip programmed with algorithms to carry out the procedures described herein. Alternatively, the controller (120) may be a dedicated device having circuitry specifically designed and programmed to carry out the procedures described herein. The controller (120) may include memory devices or may be programmed to access external memory devices, as is known in the art. Optionally, the controller (120) may be incorporated in the dressing apparatus (150).

Second Embodiment

Figure 2:
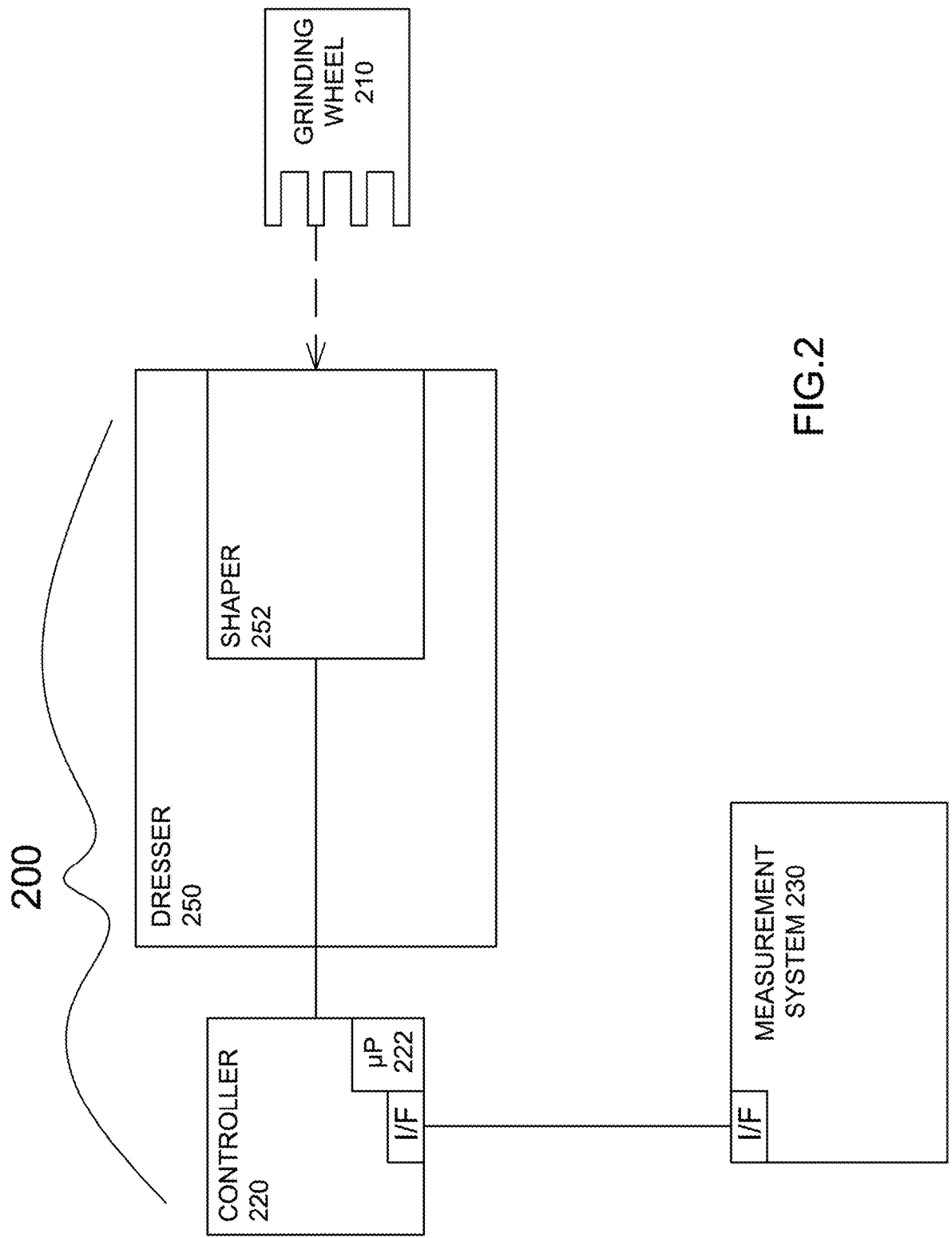
FIG. 2 schematically shows a system according to an embodiment of the invention.

FIG. 2 schematically depicts a system (200) for automatically dressing a grinding wheel (210) using a dressing apparatus (250). The system (200) includes a controller (220) programmed to control the dressing apparatus (250). The controller (220) receives, from a measurement system (230), electronic measurement data of multiple workpieces ground simultaneously by multiple grinding stations of the grinding wheel (210).

The measurement data associates measurements from each of the workpieces to a corresponding one of the grinding stations. For each grinding station, the measurement data includes comparison data, which includes a calculated difference between a measured dimension of a workpiece ground by that grinding station and a target dimension of a reference workpiece The measurement data is uploaded to a computer microprocessor (222) of the controller (220), which is programmed to convert the measurement data into offset values, and to modify a predetermined CNC process based on the offset values. The controller (220) controls a shaping tool (252) of the dressing apparatus (250) to dress the grinding wheel (210) using the modified CNC process.

Other aspects of the second embodiment are similar to those of the first embodiment and therefore duplicate discussions have been omitted.

Although the second embodiment has been described for a grinding wheel having multiple grinding stations, the grinding wheel need not have more than on grinding station.

Third Embodiment

Figure 3:
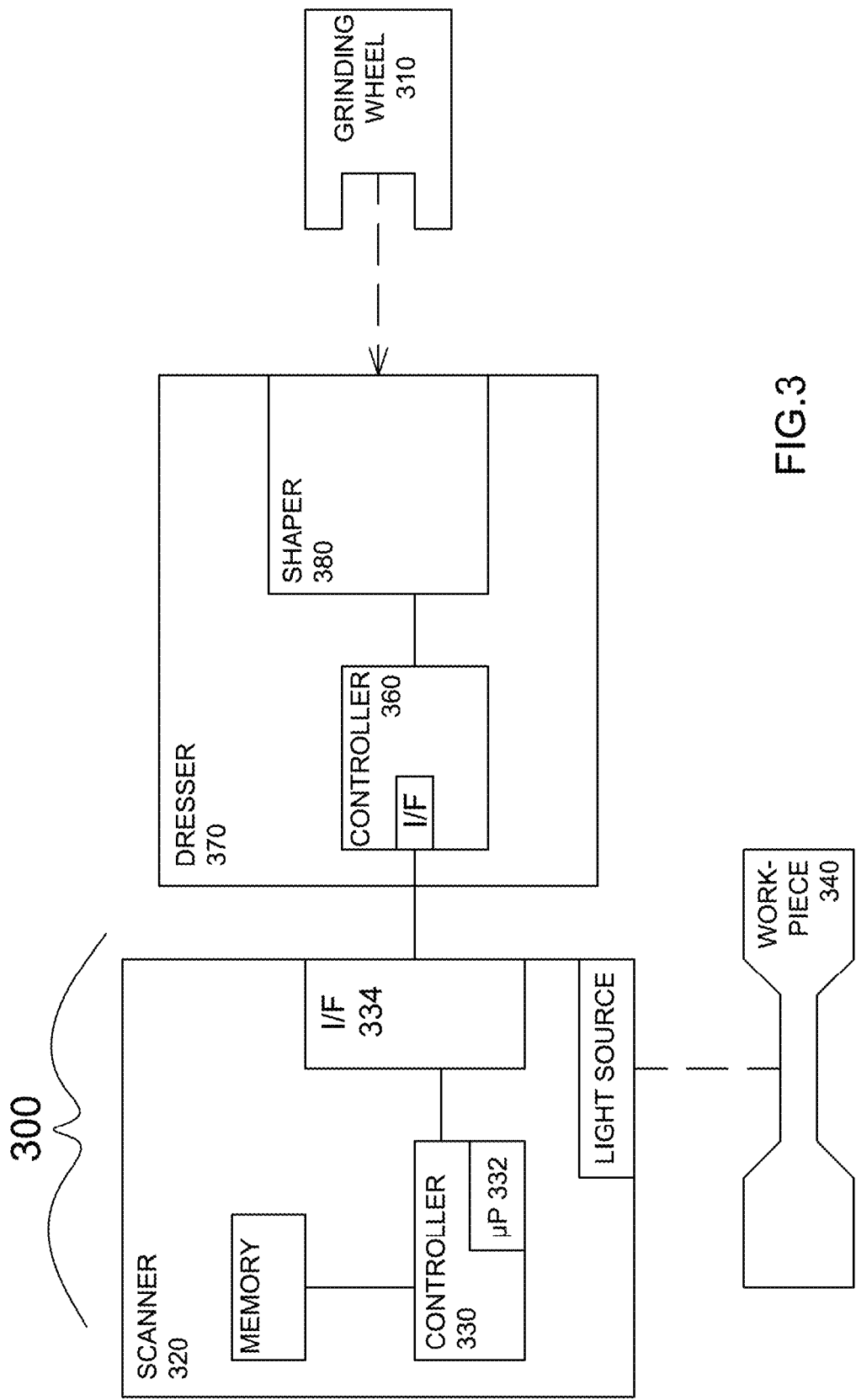
FIG. 3 schematically shows a system according to an embodiment of the invention.

FIG. 3 schematically depicts a system (300) for automatically dressing a grinding wheel (310). The system (300) includes a scanner (320) controlled by a controller (330) equipped with a microprocessor (332) and a communication interface (334). The scanner (320) is configured to optically scan a workpiece (340) to obtain scan data. The scan data is used by the controller (330) to automatically determine dimensions of the workpiece (340), and to generate a computer-readable dimensions datafile containing the dimensions of the workpiece (340). The microprocessor (332) is programmed to compare the dimensions of the workpiece (340) with reference dimensions to produce comparison results and to generate a computer-readable comparison datafile containing the comparison results. The communication interface (334) transmits the comparison datafile containing the comparison results to a controller (360) of a CNC grinding machine or dresser (370), which utilizes the comparison results to shape or dress the grinding wheel (310) so that the grinding wheel (310) can grind workpieces having the reference dimensions.

As with the first embodiment, the dresser (370) may be the DM-9 CNC Wheel Dressing Machine, or the GT610CNC Centerless Thrufeed/Infeed Grinder, or the like.

The scanner (320) may be a computer-controlled optical scanning system, which obtains the scan data by scanning the workpiece (340) using light. The scanning can be performed by a controlled rastering of a light beam at a known speed, and measuring light reflection/transmission characteristics. Alternatively, the scanning can be performed by a controlled movement of the workpiece (340) at a known speed across a light beam, and measuring light reflection/transmission characteristics. A laser beam may be used as the light beam.

The scanning of the workpiece (340) may be performed during grinding of the workpiece (340) or, preferably, after the workpiece (340) has been ground. For example, the scanner (320) may be the P4K Gauging System used in conjunction with the CAM.2 Micro Grinding System to scan and measure the workpiece (340) during grinding. In another example, the P4K Gauging System may be used to measure the workpiece (340) after grinding has been completed.

In an aspect of this embodiment, the comparison results are used in an algorithm of the controller (360) of the CNC grinding machine or dresser (370) to produce values used for dressing or shaping the grinding wheel (310) to have a shape suitable for producing one or more workpieces having the reference dimensions. For example, the values produced by the algorithm may be offset values for positioning a shaping tool (380) of the dresser (370). The offset values produced by the algorithm may be used to cause the controller (360) to modify any one or a combination of the following:

an X-position of the shaper (380) for a CNC dressing operation;
a Y-position of the shaper (380) for a CNC dressing operation;
a desired taper of a workpiece profile to be produced by the grinding wheel (310);
a desired radius of a workpiece to be produced by the grinding wheel (310); and
a desired curvature of a workpiece profile to be produced by the grinding wheel (310).

In an aspect of this embodiment, the communication interface (334) transmits the comparison datafile via an Ethernet transmission.

In an aspect of this embodiment, the scanner (320) measures the workpiece (340) at regular intervals from a first end to a second end thereof. In another aspect of this embodiment, the scanner (320) measures the workpiece (340) continuously from the first end to the second end thereof. In yet another aspect of this embodiment, the scanner (320) measures a diameter of the workpiece (340) at a selected distance from the first end thereof.

In an aspect of this embodiment, the scanner (320) measures a plurality of workpieces to determine dimensions of each of the workpieces. The dimensions datafile contains the dimensions of the workpieces. The microprocessor (332) is programmed to compare the dimensions of the workpieces with the reference dimensions to produce the comparison results. The communication interface (334) transmits the comparison datafile containing the comparison results to the controller (360) of the dresser (370). The comparison results are used by the algorithm of the controller (360) to produce values for positioning the shaping tool (380) to dress or shape a plurality of grinding stations of the grinding wheel (310), so that the grinding stations can grind workpieces having the reference dimensions.

Other aspects of the third embodiment are similar to those of the first embodiment and therefore duplicate discussions have been omitted.

Fourth Embodiment

Figure 4:
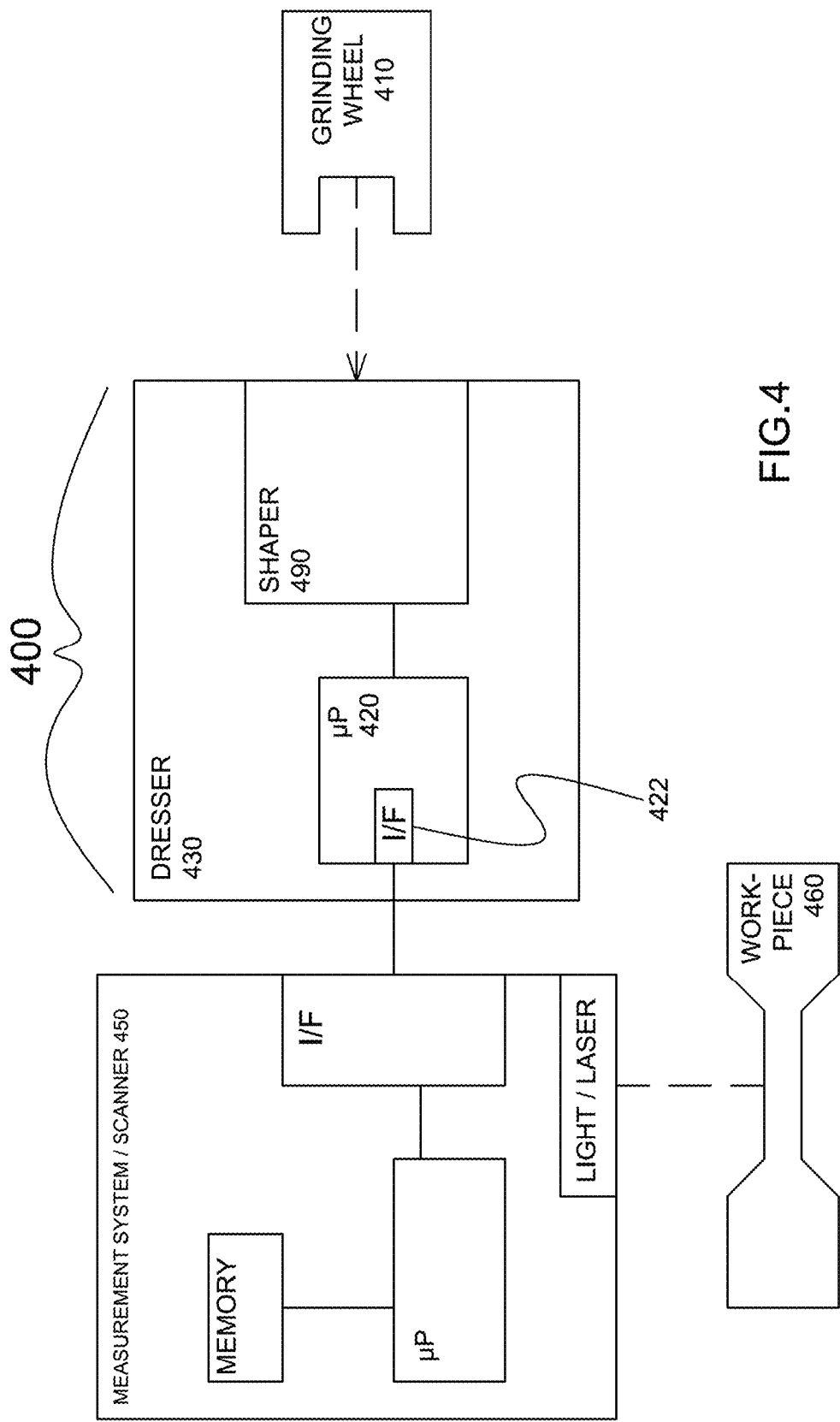
FIG. 4 schematically shows a system according to an embodiment of the invention.

FIG. 4 schematically depicts a system (400) for automatically dressing or shaping a grinding wheel (410). The system (400) includes a computer processor (420) and a CNC dressing apparatus (430) controlled by the processor (420). The processor (420) includes a communication interface (422) that receives an electronic datafile from a measurement system (450). The electronic datafile includes measurement data of a workpiece (460) ground by the grinding wheel (410). The measurement data includes comparison data corresponding to a difference between a measured dimension of the workpiece (460) and a target dimension of a reference workpiece. The processor (420) is programmed to calculate an offset value based on the difference between the measured dimension and the target dimension, and to modify a CNC control program based on the offset value. The processor (420) controls a shaping tool (490) of the CNC dressing apparatus (430) to shape the grinding wheel (410) according to the CNC control program modified with the offset value.

In an aspect of the embodiment, the electronic datafile is received directly from the measurement system (450) used to measure the workpiece (460). For example, the measurement system (450) may be a laser scanning system, or a digital camera system, or any other type of measurement system that can accurately measure dimensions of the workpiece (460) and output an electronic datafile containing measurement data of a workpiece.

In an aspect of this embodiment, the offset value calculated by the processor (420) is directly proportional to the difference between the measured dimension and the target dimension. In another aspect of this embodiment, the offset value is not proportional to the difference between the measured dimension and the target dimension but instead is calculated by the processor (420) using an algorithm that takes into account the difference between the measured dimension and the target dimension.

Other aspects of the fourth embodiment are similar to those of the first embodiment and therefore duplicate discussions have been omitted.

EXAMPLE

Discussed below is an example of a method of using a system according to an embodiment discussed above.

In this example, the measurement system is a scanner that measures a workpiece by scanning. The scanner may be the P4K Gauging System, which scans the workpiece after it has undergone grinding. Alternatively, the workpiece may be scanned during grinding, in real time, by using the P4K Gauging System in conjunction with the CAM.2 Micro Grinding System. Also, in this example, the dressing apparatus is a CNC dresser, such as the GT610CNC Centerless Thrufeed/Infeed Grinder.

The scanner scans the workpiece by moving the workpiece along a path through an optical micrometer using a linear encoder to track movement along the path. The micrometer is used to make measurements of the diameter of the workpiece to obtain diameter data. The linear encoder provides distance data, which reflects the distance traveled by the workpiece. That is, using the linear encoder to determine the longitudinal position of the workpiece being scanned as the workpiece is moved through the micrometer, the diameter measurements made by the micrometer can be correlated with positions along the length of the workpiece. This enables variations in the diameter of the workpiece along its length to be determined accurately and, consequently, the surface shape or profile of the workpiece to be known. The surface shape or profile of the workpiece can be displayed on a screen of the scanner.

More specifically, raw diameter data, pertaining to diameter measurements of the workpiece taken by the micrometer, and raw position data, pertaining to distance or length obtained from the linear encoder, are processed by the scanner using a recipe or algorithm that converts the raw data to calculated measurement data in desired units (e.g., mm or inches or the like). The scanner "feeds back" or sends the calculated measurement data to the CNC dresser (e.g., via an Ethernet connection).

The CNC dresser uses the calculated measurement data as input values to change shaping settings for shaping a grinding wheel when the grinding wheel is dressed by the CNC dresser. That is, the input values are used by the CNC dresser as part of a series of mathematical operations that generate output values used by the CNC dresser to adjust one or more parameters (e.g., an X position, a Y position, a taper, and the like) of a shaper of the CNC dresser during a dressing operation.

Figure 5:
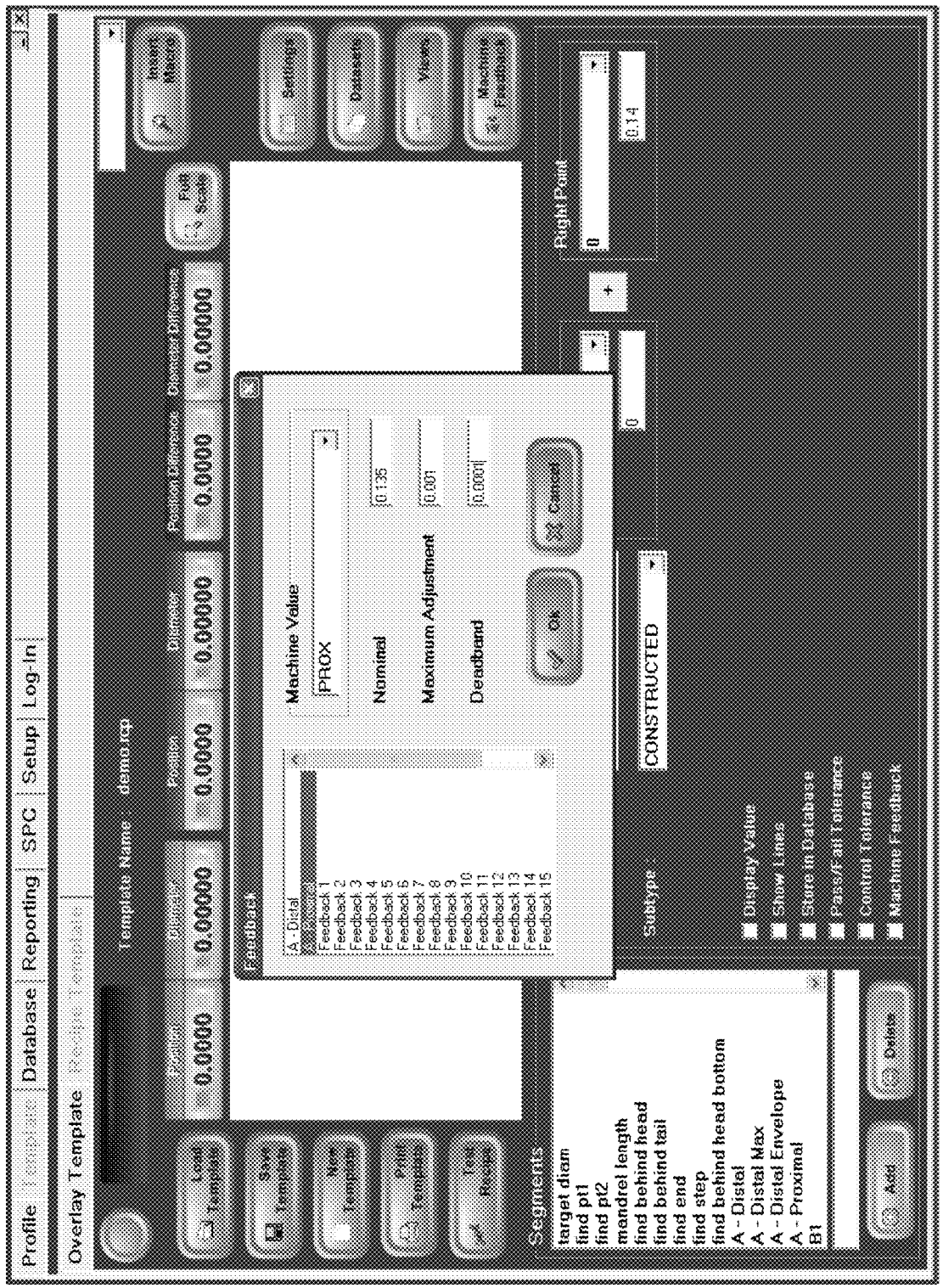
FIG. 5 shows an example of a screen shot of a controller screen of a measurement system according to an embodiment of the invention.

FIG. 5 shows an example of a screen shot of a controller screen of the scanner, where feedback data (e.g., the calculated measurement data obtained by processing the raw data using the recipe) can be selected for feeding back to the CNC dresser. For instance, the selected feedback data may be obtained as follows: a measured diameter at a desired distance from one end of the workpiece is found in the calculated measurement data, the measured diameter is compared against a nominal or desired value of the diameter at the desired distance for an ideal workpiece, and a difference between the measured diameter and the nominal value is calculated and sent to the CNC dresser.

Figure 6:
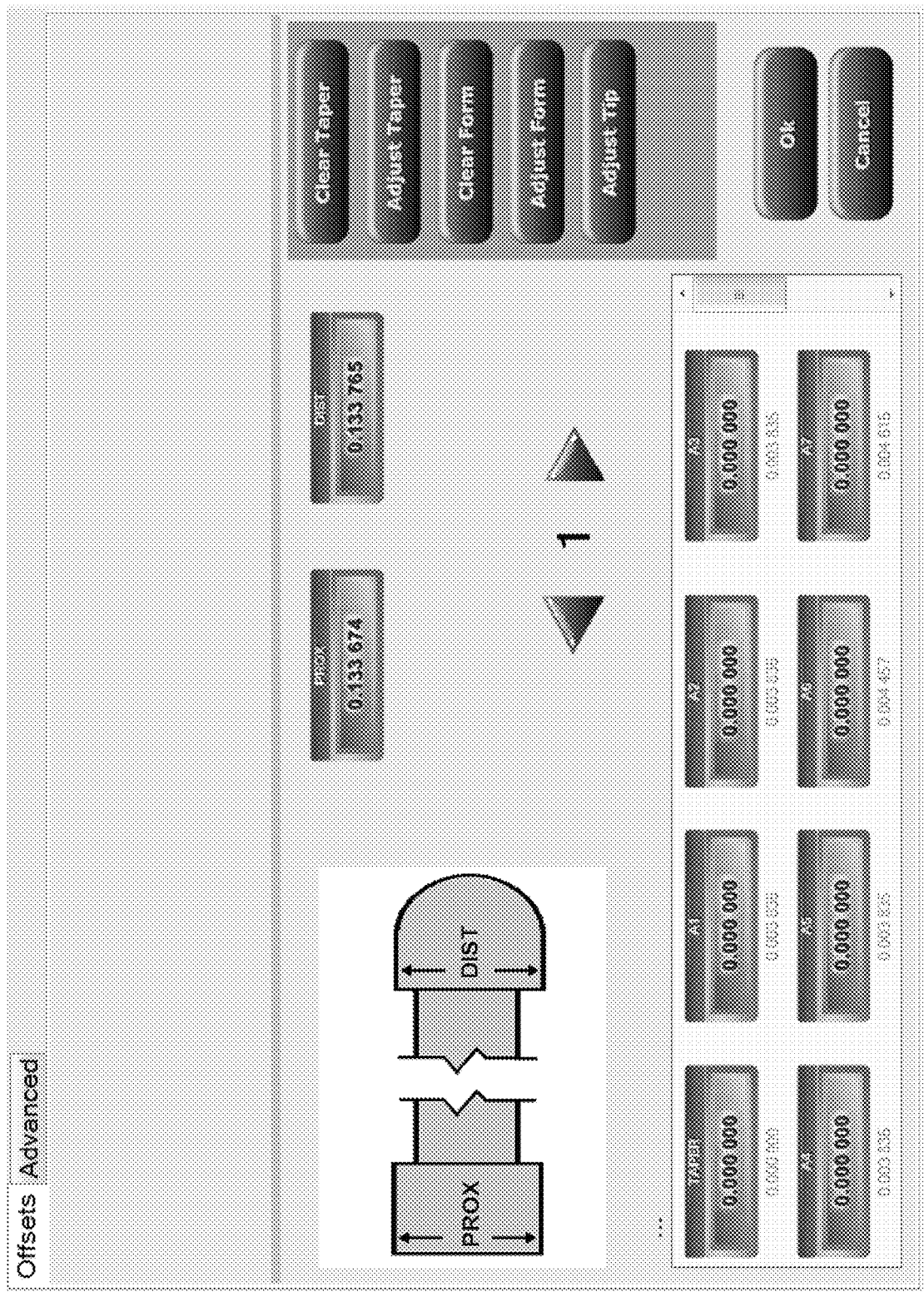
FIG. 6 shows an example of a screen shot of a controller screen of a dressing apparatus according to an embodiment of the invention.

FIG. 6 shows an example of a screen shot of a controller screen of the CNC dresser. The numerical values in the rectangular boxes with headings above are input values. The input values can be inputted manually from a touch screen or other input device of the CNC dresser, or can be sent to the CNC dresser from the scanner over an Ethernet connection, for example. The elongate buttons ("Clear Taper," Adjust Taper," Clear Form," "Adjust Form" Adjust Tip") on the right-hand side of FIG. 6 are function buttons that process the input values to generate output values (shown below the input values). For instance, an output value can be obtained by dividing a corresponding input value in half, to reflect a grinding wheel having a form that is half the depth of the ground part, and adding the quotient to an existing output value to arrive at the output value. As will be appreciated by persons skilled in the art, any sequence of mathematical operations is possible for calculating output values from the input values. The output values are utilized to determine offset values for offsetting the shaper of the CNC dresser in a dressing operation.

Figure 7:
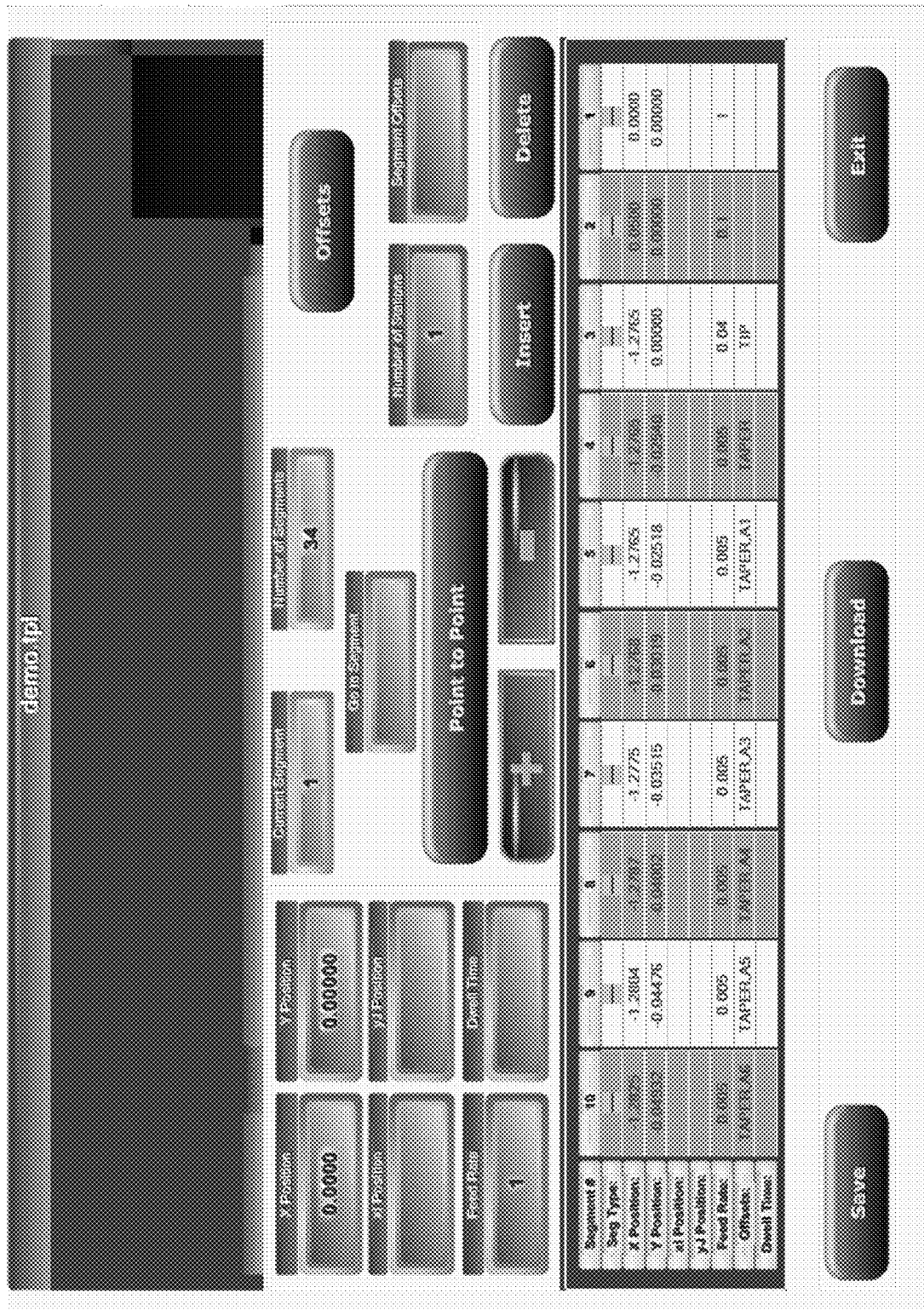
FIG. 7 shows an example of a screen shot of a controller screen of a dressing apparatus according to an embodiment of the invention.

FIG. 7 show an example of a screen shot of another controller screen of the CNC dresser. As shown in this screen shot, segments or steps in a dressing operation of the CNC dresser are associated with offsets for various parameters, with each segment having specific offset values for offsetting shaping parameters of a shaper of the CNC dresser (e.g., X Position, Y Position, and the like). The offset values of a segment are used to modify (e.g., by adding) their corresponding values for the segment, so that the shaper of the CNC dresser is adjusted for each of the segments of the dressing operation accordingly.

Finally, the above descriptions are directed to various embodiments of the present invention, and other embodiments not specifically described herein are within the scope of the present invention.

What is claimed is:

1. A method for automatically dressing a grinding wheel, the method comprising steps of:
   receiving electronic measurement data of multiple workpieces ground simultaneously by multiple grinding stations of a grinding wheel, the measurement data associating each of the workpieces to a corresponding one of the grinding stations, the measurement data including offset data for each grinding station;
   uploading the measurement data to a computer processor programmed to automatically control a shaping tool of a dressing apparatus; and
   shaping each grinding station of the grinding wheel according to the offset data;
   wherein the offset data is used by the computer processor to modify motion of the shaping tool of the dressing apparatus during the shaping step in order to shape surfaces of the grinding stations of the grinding wheel, and;
   wherein, in the shaping step, a plurality of the grinding stations are shaped simultaneously.

2. The method according to claim 1, wherein, for each grinding station, the offset data is calculated based on a reference profile and a measured profile of a workpiece ground by the grinding station.

3. The method according to claim 2, wherein the measured profile is obtained by laser scanning of the workpiece.

4. A system for automatically dressing a grinding wheel, the system comprising:
   a controller coupled to a dressing apparatus, the controller being configured to automatically control the dressing apparatus to shape the grinding wheel, with the controller including:
   a communication interface configured to receive, from a measurement system, electronic measurement data of multiple workpieces ground simultaneously by multiple grinding stations of the grinding wheel; and
   a microprocessor programmed to control a shaping tool of the dressing apparatus, wherein the measurement data associates measurements from each of the workpieces to a corresponding one of the grinding stations;
   wherein, for each grinding station, the measurement data includes offset data, which is data relating to an offset between a desired dimension and a measured dimension of a workpiece ground by that grinding station;
   wherein the measurement data is used by the microprocessor is programmed to use the measurement data to automatically modify a shaping algorithm used to dress or shape each of the grinding stations individually; and
   wherein the microprocessor is programmed to use the measurement data to modify motion of a shaping tool of the dressing apparatus in order to shape the surfaces of the grinding stations of the grinding wheel; and
   wherein the microprocessor is programmed to control the dressing apparatus to shape a plurality of the grinding stations simultaneously.

5. A method for automatically dressing a grinding wheel using a shaping tool of a dressing apparatus, the method comprising steps of:
   receiving electronic measurement data of multiple workpieces ground simultaneously by multiple grinding stations of a grinding wheel, the measurement data associating each of the workpieces to a corresponding one of the grinding stations, the measurement data including comparison data for each grinding station, wherein for each grinding station the comparison data includes a calculated difference between a measured dimension and a target dimension of a reference workpiece;
   uploading the measurement data to a computer processor programmed to convert the measurement data into offset values and thereby automatically control a shaping tool of a dressing apparatus; and
   shaping each grinding station of the grinding wheel according to a predetermined CNC process modified with the offset values;
   wherein the offset values are used by the computer processor to modify motion of the shaping tool of the dressing apparatus during the shaping step; and
   wherein, in the shaping step, a plurality of the grinding stations are shaped simultaneously.

6. The method according to claim 5, wherein, for each grinding station, an offset value of the grinding station is calculated based on the target dimension of the reference workpiece and a measured profile of a workpiece ground by the grinding station.

7. The method according to claim 6, wherein the measured profile is obtained by laser scanning of the workpiece.

8. The method according to claim 5, wherein, in the shaping step, a first station is shaped differently from another of the grinding stations.

9. A system for automatically dressing a grinding wheel, the system comprising a controller coupled to a dressing apparatus to control the dressing apparatus to shape the grinding wheel, the controller including:
   a communication interface configured to receive, from a measurement system, electronic measurement data of multiple workpieces ground simultaneously by multiple grinding stations of the grinding wheel; and
   a microprocessor programmed to control a shaping tool of the dressing apparatus, wherein the measurement data associates measurements from each of the workpieces to a corresponding one of the grinding stations;
   wherein, for each grinding station, the measurement data includes comparison data, the comparison data including a calculated difference between a measured dimension of a workpiece ground by that grinding station and a target dimension of a reference workpiece;
   wherein the microprocessor is programmed to convert the measurement data into offset values, and to automatically modify a predetermined CNC algorithm based on the offset values to produce a modified CNC algorithm;
   wherein the controller is programmed to automatically control a shaping tool of the dressing apparatus to dress the grinding wheel using the modified CNC algorithm;
   wherein the controller is programmed to use the modified CNC algorithm to modify motion of the shaping tool of the dressing apparatus during dressing of the grinding wheel to shape the surfaces of each of the grinding stations; and
   wherein the microprocessor is programmed to control the dressing apparatus to shape a plurality of the grinding stations simultaneously.

10. A method for automatically dressing a grinding wheel, the method comprising steps of:
    scanning a workpiece to determine dimensions of the workpiece;
    generating a computer-readable dimensions datafile containing the dimensions of the workpiece;
    using a processor to compare the dimensions of the workpiece with reference dimensions and to produce comparison results;

generating a computer-readable comparison datafile containing the comparison results; and transmitting the comparison datafile containing the comparison results to a controller in order to automatically control a CNC grinding machine for dressing a grinding wheel for grinding workpieces having the reference dimensions;

wherein the comparison results are used in an algorithm of the CNC grinding machine to produce values for dressing the grinding wheel to have a shape suitable for producing workpieces having the reference dimensions, with the values produced by the algorithm being offset values for positioning a shaping tool of a dressing apparatus;

wherein the offset values produced by the algorithm cause the controller to modify motion of the shaping tool during the dressing of the grinding wheel, and wherein the CNC grinding machine is controlled for shaping the grinding wheel at a plurality of grinding stations simultaneously.

11. The method according to claim 10, wherein the comparison results are used in an algorithm of the CNC grinding machine to produce values for dressing the grinding wheel to have a shape suitable for producing workpieces having the reference dimensions.

12. The method according to claim 11, wherein the values produced by the algorithm are offset values for positioning the CNC grinding machine.

13. The method according to claim 12, wherein the offset values produced by the algorithm cause the controller to modify a combination of one or more of an X-position, a Y-position, and a taper of a CNC dressing operation.

14. A system for automatically dressing a grinding wheel, the system comprising:

a controller equipped with a microprocessor and a communication interface; and a scanner controlled by controller;

wherein the scanner includes a light source for optically scanning a workpiece to obtain scan data;

wherein the microprocessor is programmed to:

automatically determine dimensions of the workpiece from the scan data;

generate a computer-readable measurements datafile containing the dimensions of the workpiece;

compare the dimensions of the workpiece with reference dimensions to produce comparison results; and generate a computer-readable comparison datafile containing the comparison results;

wherein the communication interface is configured to transmit the comparison datafile containing the comparison results to a CNC controller of a CNC dressing apparatus, so that a CNC dressing algorithm may be modified by the CNC controller using the comparison results and the grinding wheel is automatically dressed;

wherein the modified CNC dressing algorithm is used by configured for use by the CNC controller to modify motion of a shaping tool of the CNC dressing apparatus to shape a surface of the grinding wheel; and wherein the CNC dressing apparatus is configured to shape the grinding wheel at a plurality of grinding stations simultaneously.

15. A method of automatically operating a CNC dressing apparatus to shape a grinding wheel, the method comprising steps of:

receiving, at a processor of the CNC dressing apparatus, an electronic datafile containing measurement data of a workpiece ground by the grinding wheel, the measurement data including comparison data corresponding to a difference between a measured dimension of the workpiece and a target dimension of a reference workpiece;

calculating, by the processor, an offset value based on the difference between the measured dimension and the target dimension;

modifying, by the processor, a CNC control program based on the offset value; and automatically controlling a shaping tool of the CNC dressing apparatus to shape the grinding wheel according to the CNC control program modified with the offset value;

wherein the modified CNC control program modifies motion of the shaping tool of the CNC dressing apparatus during the shaping of the grinding wheel to produce a desired surface shape in the grinding wheel; and wherein the CNC dressing apparatus is controlled to shape the grinding wheel at a plurality of grinding stations simultaneously.

16. The method according to claim 15, wherein the electronic datafile is received directly from a measurement system used to measure the workpiece.

17. A system for automatically dressing a grinding wheel, the system comprising:

a computer processor equipped with a communication interface; and a CNC dressing apparatus automatically controlled by the processor;

wherein the communication interface is configured to receive an electronic datafile from a measurement system, the electronic datafile including measurement data of a workpiece ground by the grinding wheel, and the measurement data including comparison data corresponding to a difference between a measured dimension of the workpiece and a target dimension of a reference workpiece;

wherein the processor is programmed to calculate an offset value based on the difference between the measured dimension and the target dimension, and to modify a CNC control program based on the offset value to produce a modified CNC control program;

wherein the processor is programmed to control a shaping tool of the CNC dressing apparatus to shape the grinding wheel according to the modified CNC control program;

wherein the modified CNC control program is configured to modify motion of a shaping tool of the CNC dressing apparatus when shaping the grinding wheel to produce a desired surface shape in the grinding wheel; and wherein the offset value calculated by the processor is not proportional to the difference between the measured dimension and the target dimension but instead is calculated by the processor using an algorithm that takes into account the difference between the measured dimension and the target dimension.

\* \* \* \* \*